(12) United States Patent
Zou et al.

(10) Patent No.: US 11,546,829 B2
(45) Date of Patent: Jan. 3, 2023

(54) BLUETOOTH MESH NETWORK SYSTEM AND COMMUNICATION METHOD HAVING UNPROVISIONED COMMUNICATION MECHANISM

(71) Applicant: REALTEK SEMICONDUCTOR CORPORATION, Hsinchu (TW)

(72) Inventors: Shi-Meng Zou, Suzhou (CN); Bin Shao, Suzhou (CN); Yang Huang, Suzhou (CN); Qi Liu, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 90 days.

(21) Appl. No.: 17/193,311

(22) Filed: Mar. 5, 2021

(65) Prior Publication Data
US 2021/0289422 A1    Sep. 16, 2021

(30) Foreign Application Priority Data
Mar. 16, 2020 (CN) .......................... 202010182904.6

(51) Int. Cl.
| | | |
|---|---|---|
| H04W 40/24 | (2009.01) | |
| H04W 12/03 | (2021.01) | |
| H04W 4/80 | (2018.01) | |
| H04L 1/00 | (2006.01) | |
| H04W 84/18 | (2009.01) | |

(52) U.S. Cl.
CPC ......... *H04W 40/244* (2013.01); *H04L 1/0061* (2013.01); *H04W 4/80* (2018.02); *H04W 12/03* (2021.01); *H04W 84/18* (2013.01)

(58) Field of Classification Search
CPC .... G05D 1/0214; B25J 9/1676; H04L 9/0869; H04L 67/12; H04L 9/3213; H04L 1/0061; H04W 40/244; H04W 12/03; H04W 24/08; H04B 1/713
See application file for complete search history.

(56) References Cited

U.S. PATENT DOCUMENTS

| | | | |
|---|---|---|---|
| 2016/0309404 A1 | 10/2016 | Kasslin et al. | |
| 2017/0135041 A1 | 5/2017 | Miller et al. | |
| 2017/0187722 A1* | 6/2017 | Roundtree | ............ H04W 12/64 |
| 2018/0359039 A1 | 12/2018 | Daoura et al. | |
| 2019/0215555 A1 | 7/2019 | Ogle et al. | |
| 2020/0021966 A1* | 1/2020 | Wylie | ..................... H04W 4/80 |
| 2020/0077284 A1* | 3/2020 | Lowell | ................... H04L 41/22 |

FOREIGN PATENT DOCUMENTS

| | | |
|---|---|---|
| CN | 109951832 A | 6/2019 |
| EP | 2807498 B1 | 4/2017 |

OTHER PUBLICATIONS

OA letter of the counterpart TW application (appl. No. 109112016) mailed on May 31, 2001.

* cited by examiner

*Primary Examiner* — Iqbal Zaidi
(74) *Attorney, Agent, or Firm* — WPAT, PC

(57) ABSTRACT

The present invention discloses a Bluetooth mesh network system having unprovisioned communication mechanism that includes a delivering node and a receiving node. The delivering node generates a beacon signal having identification information that is not a key and performs broadcast communication. The receiving node receives the beacon signal and performs identification and processing under a network communication protocol to execute a command corresponding to the beacon signal.

12 Claims, 2 Drawing Sheets

300

Generate beacon signal having identification information that is not key and perform broadcast communication accordingly by delivering node — S310

Receive beacon signal and perform identification and processing thereon under network communication protocol to execute command corresponding to beacon signal by receiving node — S320

| LEN | TYPE | BTYPE | BDATA |
|---|---|---|---|

BLUETOOTH MESH NETWORK SYSTEM AND COMMUNICATION METHOD HAVING UNPROVISIONED COMMUNICATION MECHANISM

BACKGROUND OF THE INVENTION

1. Field of the Invention

The present invention relates to a Bluetooth mesh network system and a communication method thereof having unprovisioned communication mechanism.

2. Description of Related Art

In Bluetooth mesh network technology, a provision process is required for an electronic device to join a Bluetooth mesh network. The provision process is complex and time-consuming. When lots of nodes are presented, a huge amount of time for performing the provision process is needed. However, without the provision process, the electronic device is not able to perform communication with other nodes in the Bluetooth mesh network. The electronic device is not able to be controlled by the provisioner of the Bluetooth mesh network either.

In practical application, when the Bluetooth mesh network is being established, whether each of the nodes is able to operate normally is needed to be verified. Under such a condition, the provision process of the Bluetooth mesh network that takes a huge amount of time to be performed is unavoidable. As a result, the verification can not be performed within a short time period.

SUMMARY OF THE INVENTION

In consideration of the problem of the prior art, an object of the present invention is to provide a Bluetooth mesh network system and a communication method thereof having unprovisioned communication mechanism.

The present invention discloses a Bluetooth mesh network system having unprovisioned communication mechanism that includes a delivering node and a receiving node. The delivering node is configured to generate a beacon signal having identification information that is not a key and perform broadcast communication accordingly. The receiving node is configured to receive the beacon signal and perform identification and processing thereon under a network communication protocol to execute a command corresponding to the beacon signal.

The present invention also discloses a Bluetooth mesh network system communication method having unprovisioned communication mechanism that includes the steps outlined below. A beacon signal having identification information that is not a key is generated and broadcast communication is performed accordingly by a delivering node. The beacon signal is received and identification and processing are performed thereon under a network communication protocol to execute a command corresponding to the beacon signal by a receiving node.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a Bluetooth mesh network system and a communication method thereof having unprovisioned communication mechanism to advertise a beacon signal that includes identification information that is not a key by a delivering node, such that a receiving node receives the beacon signal to perform identification and processing thereon. The unprovisioned communication in the Bluetooth mesh network system can be accomplished.

Figures 1, 2:
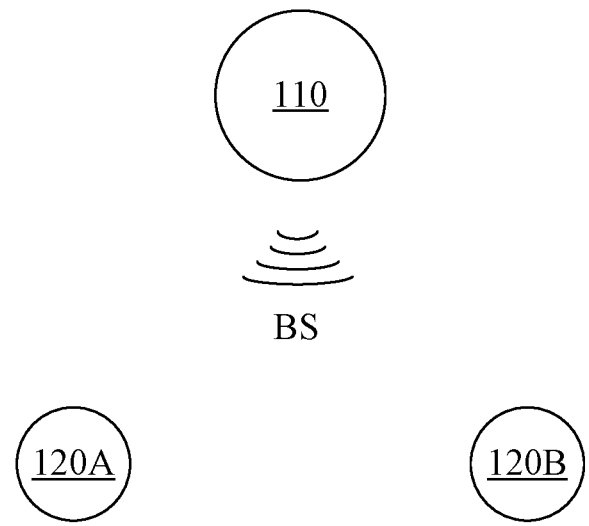
FIG. 1 illustrates a diagram of a Bluetooth mesh network system having unprovisioned communication mechanism according to an embodiment of the present invention.
FIG. 2 illustrates a diagram of the beacon signal according to an embodiment of the present invention.

Reference is now made to FIG. 1. FIG. 1 illustrates a diagram of a Bluetooth mesh network system 100 having unprovisioned communication mechanism according to an embodiment of the present invention. The Bluetooth mesh network system 100 includes a delivering node 110 and a plurality of receiving nodes 120A and 120B.

In an embodiment, each of the nodes included in the Bluetooth mesh network system 100 can be distinguished as such as, but not limited to a provisioner node, a relay node, a friend node, a lower power node (LPN) or a combination thereof (not illustrated) defined in Bluetooth mesh network protocol. Any one of the nodes can serve as the delivering node 110 that delivers a signal, while the other nodes serve as the receiving nodes 120A and 120B that receive the signal.

The signal transmission and reception among the delivering node 110 and the receiving nodes 120A and 120B can be performed without provision process. The thorough provision process may include such as, but not limited to a secured disposition flow and a subsequent configuration process. The delivering node 110 and receiving nodes 120A and 120B can perform communication by using the transmission of a beacon signal BS without the need of provision process.

The delivering node 110 is configured to generate the beacon signal BS having identification information that is not a key and perform broadcast communication accordingly.

Reference is now made to FIG. 2. FIG. 2 illustrates a diagram of the beacon signal BS according to an embodiment of the present invention.

In an embodiment, the beacon signal BS is delivered on the basis of the broadcast protocol established upon Bluetooth low energy (BLE) protocol. The beacon signal BS may includes entries of such as, but not limited to length LEN, type TYPE, beacon type BTYPE and beacon data BDATA.

The entry of length LEN is the total length of the packet of the beacon signal BS. The entry of type TYPE may include such as, but not limited to the command that the delivering node 110 delivers to the receiving nodes 120A and 120B. The entry of beacon type BTYPE, in an embodiment, can be a self-defined type depending on different applications. The entry of beacon data BDATA may include the identification information that is not the key. In an embodiment, the identification information can include such as, but not limited to a product serial number or a manufacturer identification code.

Each of the receiving nodes 120A and 120B is configured to receive the beacon signal BS and perform identification and processing thereon under a network communication protocol. In an embodiment, the network communication protocol is a bearer layer that is a bottom layer of the mesh network communication protocol, or a generic access profile (GAP) layer of a Bluetooth low energy (BLE) protocol.

By using such a method, the receiving nodes 120A and 120B can perform identification and processing on the beacon signal BS without the transmission and processing of a plurality of upper layers in the network communication protocol, e.g. the network layer, the lower transport layer, the upper transport layer, the access layer, the foundation model layer and the model layer.

As a result, the delivering node 110 and the receiving nodes 120A and 120B can perform signal transmission by using a method similar to advertising defined in Bluetooth protocol without the use of key. By using the identification information included in such as the entry of beacon data BDATA illustrated in FIG. 2, the receiving nodes 120A and 120B can identify the beacon signal BS transmitted by the delivering node 110. Further, the receiving nodes 120A and 120B can identify the command included in such as the entry of type TYPE illustrated in FIG. 2 in the beacon signal BS, to further execute the command. By using such a method, the delivering node 110 and the receiving nodes 120A and 120B can perform unprovisioned communication.

In an embodiment, the beacon signal BS may include relay function supporting information and relay count information in the entry of beacon data BDATA. By including the relay function supporting information, the beacon signal BS can be relayed by other nodes when a distance of a receiving node is too far from the delivering node. The relay count information further determines the number of times that the beacon signal can be relayed.

In an embodiment, the receiving nodes 120A and 120B are further configured to store the beacon signal BS, so as to ignore the same beacon signal BS when the beacon signal BS is received. By using such a method, the receiving nodes 120A and 120B can prevent the cyber attack from hackers that sends a large amount of repeat messages.

In an embodiment, the delivering node 110 retransmits the beacon signal BS after a predetermined time period. By using such a method, when the communication environment is bad, the delivering node 110 can increase the possibility that the beacon signal BS is successfully received by the receiving nodes 120A and 120B.

In an embodiment, the delivering node 110 can encrypt the beacon signal BS by using such as, but not limited to AES-CCM encryption technology. The receiving nodes 120A and 120B can perform cyclic redundancy check on the beacon signal BS to increase the security of the signal transmission.

In an application, the delivering node 110 is a provisioner node and intends to perform a quick verification on a large amount of receiving nodes (e.g. light bulbs having different displayed colors). The delivering node 110 can transmit the beacon signal BS to control the receiving nodes (e.g. to display different colors) by using the unprovisioned communication mechanism described above. The verification can be quickly performed.

In some approaches, the nodes in the Bluetooth mesh network system can only communicate with each other by using signal transmission with key, after the provision process is performed. Further, the nodes that receives the signal has to process the signal through a plurality of layers defined in the mesh network communication protocol, such that the content can only be identified and processed in the model layer, which is the top layer in the protocol. Such as method can not be used to perform quick verification on the nodes included in the Bluetooth mesh network system.

The Bluetooth mesh network system of the present invention can broadcast the beacon signal having identification information that is not a key by using delivering node, such that the receiving node receives the beacon signal and performs identification and processing thereon under the network communication protocol. The unprovisioned communication can thus be accomplished. As a result, the Bluetooth mesh network system can control the internal nodes to form a network system under the unprovisioned condition to subsequently perform verification.

It is appreciated that the number of the delivering node 110 and the receiving nodes 120A and 120B in the Bluetooth mesh network system described above is merely an example. In other embodiments, the number of the delivering node 110 and the receiving nodes 120A and 120B can be any number that is one or larger than one. Further, the delivering node 110 can serve as the receiving node for other nodes, and the receiving nodes 120A and 120B can serve as the delivering node for other nodes.

Figure 3:
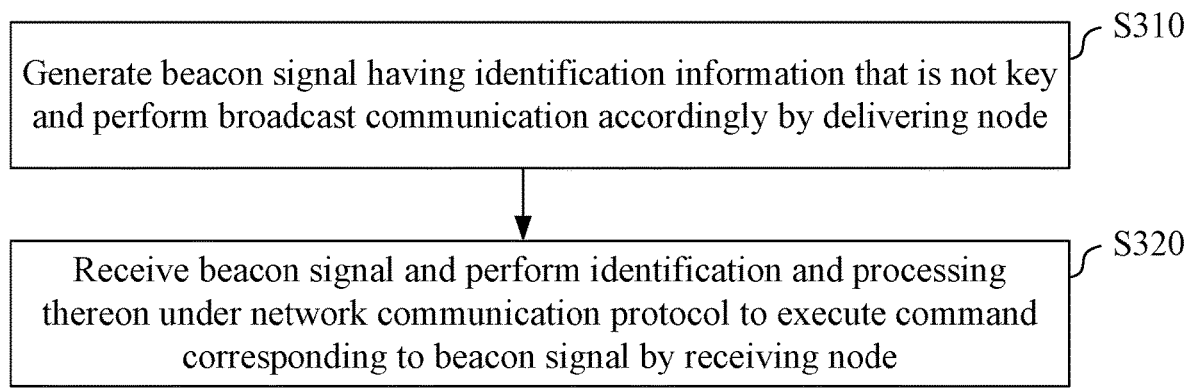
FIG. 3 illustrates a flow chart of a Bluetooth mesh network system communication method according to an embodiment of the present invention.

Reference is now made to FIG. 3. FIG. 3 illustrates a flow chart of a Bluetooth mesh network system communication method 300 according to an embodiment of the present invention.

Besides the apparatus described above, the present invention further discloses the Bluetooth mesh network system communication method 300 that can be used in such as, but not limited to the Bluetooth mesh network system 100 illustrated in FIG. 1. An embodiment of the Bluetooth mesh network system communication method 300 is illustrated in FIG. 3 and includes the steps outlined below.

In step S310, the beacon signal BS having identification information that is not a key is generated and broadcast communication is performed accordingly by the delivering node 110.

In step S320, the beacon signal BS is received and identification and processing are performed thereon under the network communication protocol to execute the command corresponding to the beacon signal BS by the receiving nodes 120A and 120B.

It is appreciated that the embodiments described above are merely an example. In other embodiments, it should be appreciated that many modifications and changes may be made by those of ordinary skill in the art without departing, from the spirit of the invention.

In summary, the Bluetooth mesh network system and a communication method thereof having unprovisioned communication mechanism can broadcast the beacon signal having identification information that is not a key by using delivering node, such that the receiving node receives the beacon signal and performs identification and processing thereon under the network communication protocol. The unprovisioned communication can thus be accomplished.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A Bluetooth mesh network system having unprovisioned communication mechanism, the system comprising:

a delivering node configured to generate a beacon signal having identification information that is not a key and perform broadcast communication accordingly; and a receiving node configured to receive the beacon signal and perform identification and processing on the beacon signal under a network communication protocol to execute a command corresponding to the beacon signal;

wherein the receiving node is further configured to store the beacon signal, and the receiving node ignores the beacon signal having repeat content received next time.

2. The Bluetooth mesh network system of claim 1, wherein the network communication protocol is a bearer layer that is a bottom layer of the mesh network communication protocol, or a generic access profile (GAP) layer of a Bluetooth low energy (BLE) protocol.

3. The Bluetooth mesh network system of claim 1, wherein the identification information is a product serial number or a manufacturer identification code.

4. The Bluetooth mesh network system of claim 1, wherein the beacon signal includes relay function supporting information and relay count information.

5. The Bluetooth mesh network system of claim 1, wherein the delivering node retransmits the beacon signal after a predetermined time period.

6. The Bluetooth mesh network system of claim 1, wherein the delivering node encrypts the beacon signal and the receiving node performs cyclic redundancy check on the beacon signal.

7. A Bluetooth mesh network system communication method having unprovisioned communication mechanism, the method comprising:

generating a beacon signal having identification information that is not a key and performing broadcast communication accordingly by a delivering node;

receiving the beacon signal and performing identification and processing on the beacon signal under a network communication protocol to execute a command corresponding to the beacon signal by a receiving node;

storing the beacon signal by the receiving node; and ignoring the beacon signal having repeat content received next time by the receiving node.

8. The Bluetooth mesh network system communication method of claim 7, wherein the network communication protocol is a bearer layer that is a bottom layer of the mesh network communication protocol, or a generic access profile (GAP) layer of a Bluetooth low energy (BLE) protocol.

9. The Bluetooth mesh network system communication method of claim 7, wherein the identification information is a product serial number or a manufacturer identification code.

10. The Bluetooth mesh network system communication method of claim 7, wherein the beacon signal includes relay function supporting information and relay count information.

11. The Bluetooth mesh network system communication method of claim 7, further comprising:

retransmitting the beacon signal after a predetermined time period by the delivering node.

12. The Bluetooth mesh network system communication method of claim 7, further comprising:

encrypting the beacon signal by the delivering node and performing cyclic redundancy check on the beacon signal by the receiving node.

\* \* \* \* \*